(12) United States Patent
Jones et al.

(10) Patent No.: US 8,646,860 B1
(45) Date of Patent: Feb. 11, 2014

(54) PIEZOELECTRIC SENSOR ARRANGEMENT FOR SENSING FLUID LEVEL IN SMALL VOLUME AND IRREGULAR SHAPE RESERVOIRS

(75) Inventors: Brent R. Jones, Sherwood, OR (US); Edward F. Burress, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 45 days.

(21) Appl. No.: 13/555,572

(22) Filed: Jul. 23, 2012

(51) Int. Cl.
*B41J 2/195* (2006.01)

(52) U.S. Cl.
USPC .......................................................... 347/7

(58) Field of Classification Search
CPC ............ G01F 23/2961; G01F 23/2966; G01F 23/2967; G01F 23/00
USPC ............................................. 347/6, 7, 84–86
See application file for complete search history.

(56) References Cited

U.S. PATENT DOCUMENTS

| | | |
|---|---|---|
| 4,570,483 A | 2/1986 | Sobue |
| 4,703,652 A | 11/1987 | Itoh et al. |
| 4,815,323 A | 3/1989 | Ellinger et al. |
| 5,578,994 A | 11/1996 | Cherek et al. |
| 5,773,913 A | 6/1998 | Casselden |

*Primary Examiner* — An Do
(74) *Attorney, Agent, or Firm* — Maginot, Moore & Beck, LLP

(57) ABSTRACT

A fluid level sensor measures a height of a fluid in a volume with a plurality of piezoelectric sensors arranged along at least one wall of a container. The sensors are positioned to enable activated sensors to interact with the materials adjacent the sensors to produce electrical signals in more than one of the sensors. These electrical signals are used to identify the fluid level in the volume.

19 Claims, 3 Drawing Sheets

_US 8,646,860 B1_

PIEZOELECTRIC SENSOR ARRANGEMENT FOR SENSING FLUID LEVEL IN SMALL VOLUME AND IRREGULAR SHAPE RESERVOIRS

TECHNICAL FIELD

This disclosure relates generally to fluid level sensing and, in particular, to fluid level sensing in on-board ink reservoirs of printheads associated with phase change ink imaging devices.

BACKGROUND

In general, inkjet printers include at least one printhead that ejects drops of liquid ink onto an image receiving surface. A phase change inkjet printer employs phase change inks that are solid at ambient temperature, but transition to a liquid phase at an elevated temperature. The melted ink can then be ejected onto an image receiving surface by a printhead. The image receiving surface may be a media substrate or an intermediate imaging member. The image on the intermediate imaging member is later transferred to an image receiving substrate. Once the ejected ink is on the image receiving surface, the ink droplets quickly solidify to form an image.

Printers store a variety of fluids to enable ink imaging and ensure reliable printer operation. In some cases, monitoring of the volume or the head height of the stored fluids is important. Accurate monitoring of the head height is especially important where the head height of a stored fluid affects the mechanism or system that draws or uses the fluid. For example, restricting the head height range within an ink reservoir and precisely controlling the replenishment to an on-board ink reservoir of a printhead are often needed to prevent overfill-caused dripping of ink from the printhead jet orifices and to prevent the introduction of air if the fluid level is depleted below tolerable levels.

Currently available fluid sensing systems suffer from a number of drawbacks. For instance, applications in which small reservoirs or holding tanks are needed to store a fluid may not offer the space or fluid height required to accommodate known fluid sensing systems, such as float-based systems. Also, many "sense and fill" systems suffer from significant hysteresis problems in that these systems tend to respond late or overfill before flow is stopped. Moreover, fluid sensing systems that sense fluid materials by detecting a resistance change upon attaining a liquid level are dependent on consistent material properties, which may change over the life of the mechanism or system that uses the fluid. For example, the properties of a fluid may deteriorate over time due to age degradation, or the fluid may be replaced with a fluid having different properties. Therefore, improvements to sensing systems that enable fluid sensing in small and irregular shape reservoirs and that can detect fluids with varying properties are desired. Improvements to sensing systems that can respond to small, short term fluid level changes and longer term, continuous changes where the initial fluid level may be at any point in the usable volume range are also desirable.

SUMMARY

A fluid level sensor has been developed that enables measurement of a height of fluid in small volume and irregular shape reservoirs. The fluid level sensor includes a container having at least one wall that forms a volume for containing a fluid, a plurality of piezoelectric sensors arranged along the at least one wall of the container to interact with the fluid within the volume, two of the piezoelectric sensors being positioned to enable fluid in the volume to cover simultaneously a portion, but not all, of a surface area of a first piezoelectric sensor of the two piezoelectric sensors and a portion, but not all, of a surface area of a second piezoelectric sensor of the two piezoelectric sensors, the portion of the surface area of the first piezoelectric sensor covered by the fluid being larger than the portion of the surface area of the second piezoelectric sensor covered by the fluid, and a pair of conductors operatively connected to each piezoelectric sensor, the conductors configured to conduct electrical signals to and from each piezoelectric sensor.

A printer incorporates the fluid level sensor in a printhead of the printer to improve the measurement accuracy of ink head height within the printhead. The printer includes an inkjet printing apparatus having a plurality of inkjet ejectors, the inkjet printing apparatus being configured to eject ink from the inkjet ejectors onto a substrate, an ink reservoir configured to supply ink to the plurality of inkjet ejectors, the ink reservoir having at least one wall that forms a volume for containing the ink, a plurality of piezoelectric sensors arranged along the at least one wall of the ink reservoir to interact with the ink within the volume, two of the piezoelectric sensors being positioned to enable the ink in the volume to cover simultaneously a portion, but not all, of a surface area of a first piezoelectric sensor of the two piezoelectric sensors and a portion, but not all, of a surface area of a second piezoelectric sensor of the two piezoelectric sensors, the portion of the surface area of the first piezoelectric sensor covered by the ink being larger than the portion of the surface area of the second piezoelectric sensor covered by the ink, and a pair of conductors operatively connected to each piezoelectric sensor, the conductors configured to conduct electrical signals to and from each piezoelectric sensor.

In another embodiment, an ink cartridge incorporates the fluid level sensor to enable measurement of a height of aqueous or emulsified ink contained within the ink cartridge. The ink cartridge includes an ink reservoir formed within the cartridge, the ink reservoir having at least one wall that forms a volume for containing the liquid ink, a plurality of piezoelectric sensors arranged along the at least one wall of the ink reservoir to interact with the liquid ink within the volume, two of the piezoelectric sensors being positioned to enable the liquid ink in the volume to cover simultaneously a portion, but not all, of a surface area of a first piezoelectric sensor of the two piezoelectric sensors and a portion, but not all, of a surface area of a second piezoelectric sensor of the two piezoelectric sensors, the portion of the surface area of the first piezoelectric sensor covered by the liquid ink being larger than the portion of the surface area of the second piezoelectric sensor covered by the liquid ink, and a pair of conductors operatively connected to each piezoelectric sensor, the conductors configured to conduct electrical signals to and from each piezoelectric sensor.

BRIEF DESCRIPTION OF THE DRAWINGS

The foregoing aspects and other features of a fluid sensor configured to measure a height of a fluid are explained in the following description, taken in connection with the accompanying drawings.

DETAILED DESCRIPTION

Figure 4:
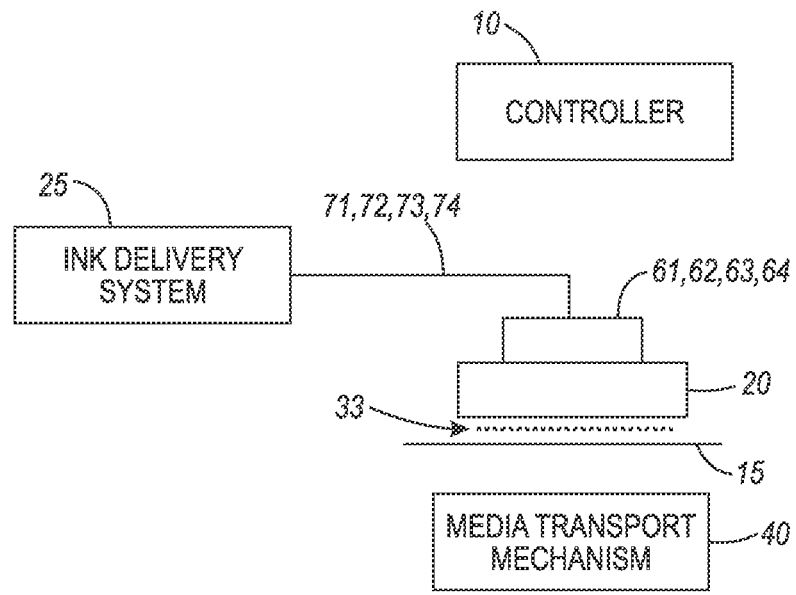
FIG. 4 is a schematic block diagram of an embodiment of an inkjet printer.
Figure 5:
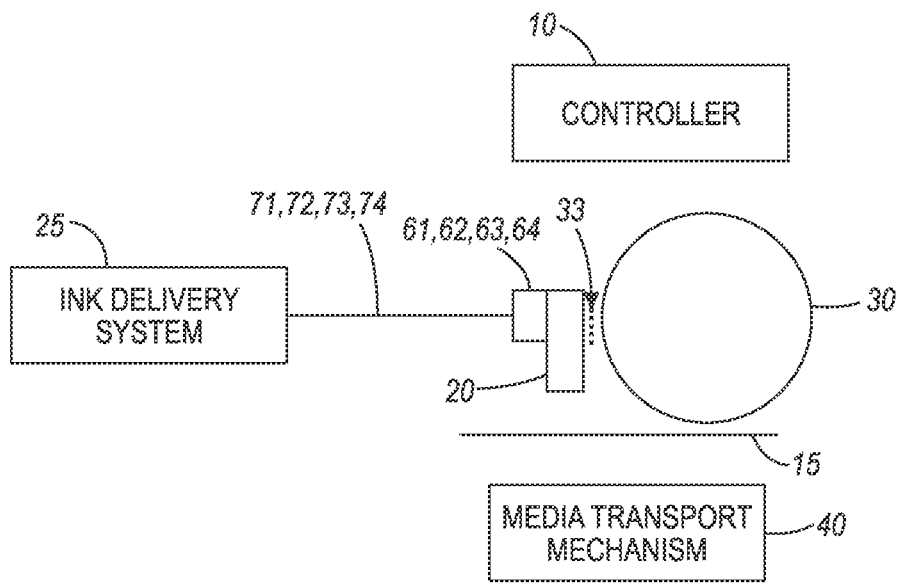
FIG. 5 is a schematic block diagram of an embodiment of an inkjet printer that is similar to the embodiment of FIG. 4.

For a general understanding of the present embodiments, reference is made to the drawings. In the drawings, like reference numerals have been used throughout to designate like elements. FIGS. 4 and 5 are schematic block diagrams of an embodiment of an inkjet printer that includes a controller 10 and at least one printhead 20. The printhead 20 includes a plurality of inkjets configured to eject drops of ink 33 either directly onto a print medium 15 (FIG. 4) or onto an intermediate transfer surface 30 (FIG. 5). A print medium transport mechanism 40 moves the print medium relative to the printhead 20, which can be stationary or can move in a transverse direction.

FIG. 5 is a schematic block diagram of an embodiment of an inkjet printer that is similar to the embodiment of FIG. 4. The printer includes a transfer drum 30 for receiving the drops ejected by the printhead 20. A print media transport mechanism 40 transports a print medium 15 to a position proximate the transfer drum 30 where a transfix roller (not shown) forms a nip with the drum 30. The medium 15 enters the nip where the image printed on the transfer drum 30 is transferred to the print medium 15 and the transport mechanism carries the medium to a tray for retrieval or subsequent processing.

The printer depicted in FIGS. 4 and 5 includes an ink delivery system 25 that is configured to supply ink to a plurality of on-board ink reservoirs 61, 62, 63, 64 associated with the at least one printhead 20. Respective ink supply channels 71, 72, 73, 74 operatively connect the ink delivery system 25 to the on-board ink reservoirs of the printhead 20. The printer can further include remote ink containers (not shown) that are configured to communicate melted phase change ink held therein to the on-board reservoirs 61, 62, 63, 64. The ink supply channels 71, 72, 73, 74 can be conduits for molten ink or can be drip paths as typically implemented with an ink supply system that deposits ink directly into printhead reservoirs 61, 62, 63, 64 as ink is melted.

In one embodiment, the printer is a phase change ink imaging device. Accordingly, the ink delivery system comprises a phase change ink delivery system that has at least one source of at least one color of phase change ink in solid form. The phase change ink delivery system also includes a melting and supply apparatus (not shown) for melting the solid form of the phase change ink into a liquid form and delivering the melted ink to the respective on-board ink reservoir 61, 62, 63, 64.

The on-board ink reservoirs 61-64 are configured to contain the melted solid ink and can be heated to maintain the ink in liquid form. The ink supply channels 71-74 can similarly be heated. The melted solid ink can be supplied to the on-board ink reservoirs 61-64 by any known fluid transport technique. For example, the ink delivery system 25 can drip melted ink into the reservoirs or, if delivered through a conduit, can generate a pressure differential to enable ink to flow from an ink source to the on-board ink reservoirs 61-64. Once the pressurized ink reaches the printhead via an ink supply channel, the ink is collected in the on-board reservoir.

Figure 1:
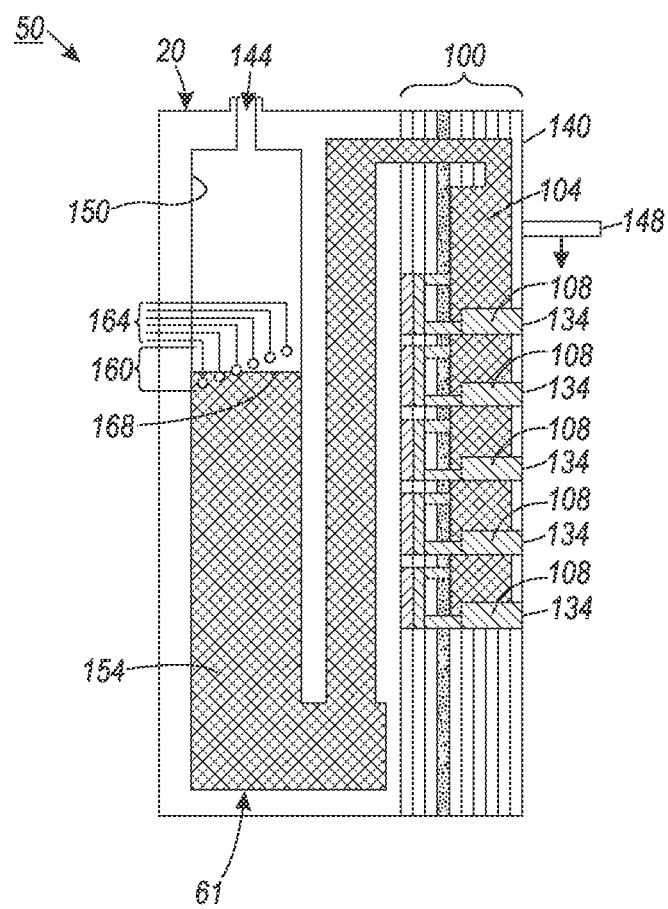
FIG. 1 is a section view of a printhead that includes at least one on-board reservoir and that incorporates the fluid sensor for measuring the height of ink within the printhead.

FIG. 1 shows an embodiment of a printhead 20 that includes at least one on-board reservoir 61. The on-board reservoir 61 is configured to communicate ink 154 to a jet stack 100 that includes a plurality of inkjets 108. The jet stack 100 can be formed in many ways, but in this example, the stack 100 is formed of multiple laminated sheets or plates, such as stainless steel plates. Cavities etched into each plate align to form channels and passageways that define the inkjets 108 for the printhead. Larger cavities align to form larger passageways that run the length of the jet stack. These larger passageways define ink manifolds 104 that are arranged to supply ink to the inkjets 108. The plates of the jet stack 100 are stacked in face-to-face registration with one another and then brazed or otherwise bonded together to form a mechanically unitary and operational jet stack.

In one embodiment, each inkjet 108 has an inlet channel that receives ink from the manifold 104, a reservoir, or other ink containing structure. The ink flows from the inlet channel into a pressure chamber or body chamber that is bounded on one side, for example, by a flexible diaphragm. An electromechanical transducer is attached to the flexible diaphragm overlying the body chamber. The electromechanical transducer can be a piezoelectric transducer that includes a piezo element disposed, for example, between electrodes that enable firing signals to be received from the controller 10. Actuation of the piezoelectric transducer with a firing signal causes the transducer to distend the diaphragm and urge ink from the pressure chamber to an outlet channel. The outlet channel includes an aperture 134 formed in a jet stack aperture plate 140 through which ink drops are ejected.

During operation, capillary action causes the ink 154 from the on-board printhead reservoir 61 to fill the ink manifolds 104, inlet channels, pressure chambers, and outlet channels of the inkjets 108 and form a meniscus (not shown) at each aperture 134 prior to being expelled from the apertures 134 in the form of a droplet. The size of the apertures and channels of the inkjets enable the ink meniscus to be pinned at the aperture 134 until the inkjet 108 is actuated while preventing air from entering the printhead 20 through the apertures 134.

The ink 154 can be purged from the printhead 20 by applying a positive pressure source or a negative pressure source to ink 154 in the on-board printhead reservoir 61. For example, a positive pressure applied can be applied through an opening or vent 144 in the reservoir 61. This positive pressure causes the ink 154 to discharge through the plurality of inkjets 108 in the jet stack 100 and out of the corresponding plurality of apertures 134 in the aperture plate 140. A scraper or wiper blade 148 can also be drawn across the aperture plate 140 to squeegee away any excess liquid phase change ink, as well as any paper, dust, or other debris that has collected on the aperture plate 140. The waste ink wiped-off or otherwise removed from the face of the printhead is typically caught by a gutter, which ultimately channels or otherwise directs the ink toward a waste ink collection container (not shown) for later disposal.

Referring still to FIG. 1, a piezoelectric sensor arrangement 50 for sensing fluid level in small volume and irregular shape reservoirs is shown in operative association with the printhead 20. The sensor arrangement includes a container that, in this example, is shown as the on-board ink reservoir 61 of the printhead 20. The ink reservoir 61 has at least one wall 150 that forms a volume for containing a fluid, such as the liquid phase change ink 154. In at least one additional embodiment, the container is an ink reservoir formed within a liquid ink cartridge. In this embodiment, the cartridge is configured to store aqueous or emulsified ink within the ink reservoir and to supply the ink to a plurality of inkjets when the cartridge is operatively associated with a printer. In another embodiment, the liquid ink cartridge can contain ink that is nominally solid at non-elevated temperatures but is liquid in a functional state when heated with an internal or external heater.

The sensor arrangement 50 further includes a plurality of piezoelectric sensors 160 that are arranged along the at least one wall 150 of the ink reservoir 61 to interact with the ink 154 within the volume. Note that the printhead illustrated in FIG. 1 is simplified and not necessarily to scale. The acceptable upper and lower fluid levels in the printhead are not illustrated, but a typical sensor arrangement can span such a range. The sensors are illustrated from the side view, but for a greater level range, the sensor array can be oriented in the transverse direction.

Arranging the sensors 160 along the at least one wall 150 can be accomplished by any method that provides fixed spacing between the plurality of sensors 160. For example, in one embodiment, the sensors 160 can be fastened to the wall 150 by using adhesive. In another embodiment, the sensors 160 can be incorporated in a planar member that is attached to the wall by using rigid fasteners, such as screws. In yet another embodiment, the sensors 160 can be attached to the wall by providing a feature in the wall 150 that enables an interference fit between the sensor 160 and the wall 150 of the ink reservoir 61. In yet another embodiment, the sensors 160 can be suspended from a cover or panel above or extended from a shelf or floor below the fluid. The distance or offset between successive sensors of the plurality of piezoelectric sensors 160 is discussed in more detail below.

The sensors 160 can be constructed using piezoelectric film products or using ceramic resonator material. In the latter construction, the ceramic resonator materials are coated with conductive layers to form the piezoelectric element and an electrical ground return path. A pair of conductors 164 is operatively connected to each piezoelectric sensor 160. The conductors 164 are configured to conduct electrical signals to and from each piezoelectric sensor. For simplicity, a single line is used to depict the pair of conductors 164 for each sensor 160 of FIG. 1. The controller 10 is operatively connected to the pair of conductors 164 from each of the piezoelectric sensors 160 and configured to activate the sensors through the conductors operatively connected to each of the sensors. Activation of the sensors through the conductors enables the controller to identify a fluid level 168 of the ink 154 from differences between electrical signals received from each sensor in the plurality of sensors. The activation of the plurality of sensors is discussed in more detail below.

Figure 2:
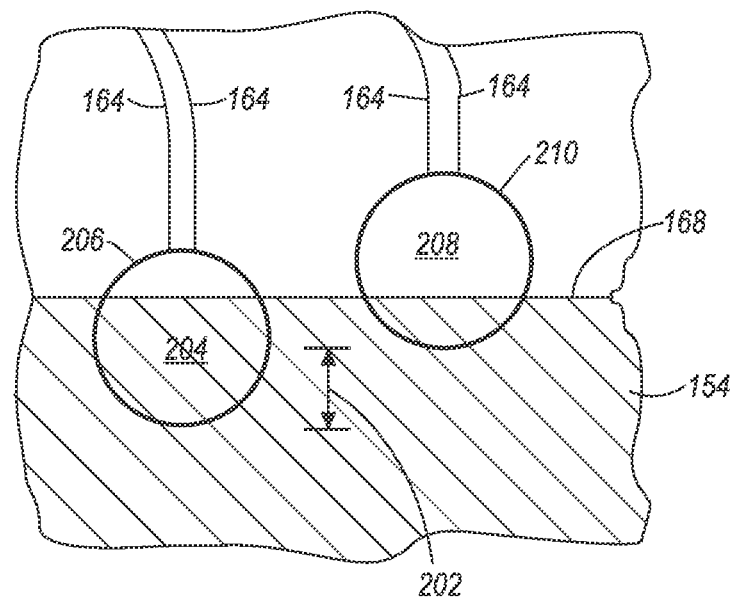
FIG. 2 is a partial view of two of a plurality of piezoelectric sensors positioned relative to one another.
Figure 3:
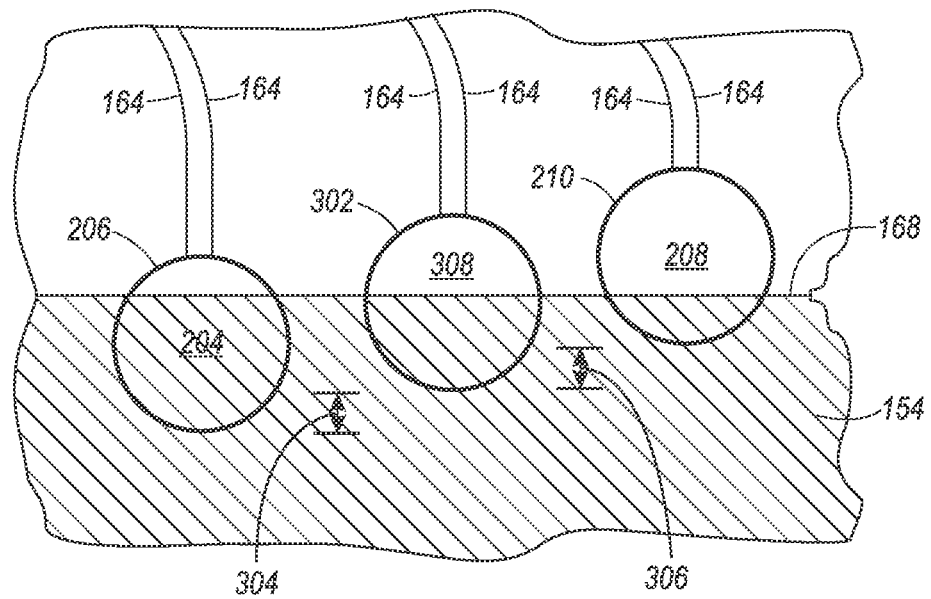
FIG. 3 is a partial view of a third piezoelectric sensor positioned between the two piezoelectric sensors of FIG. 2 at a first distance and a second distance from the two piezoelectric sensors.

FIGS. 2 and 3 show two embodiments of the distances or offsets between successive sensors of the sensor arrangement 50. For simplicity, the figures depict the smallest number of successive sensors needed to describe the distances and positions of the sensors relative to one another and the resulting positional relationship of the sensors near the fluid level 168 of the ink 154.

FIG. 2 shows a partial view of two sensors in the plurality of piezoelectric sensors 160 positioned relative to one another at a distance 202 from one another. The distance 202 enables ink 154 in the volume to cover simultaneously a portion, but not all, of a surface area 204 of a first piezoelectric sensor 206 of the two piezoelectric sensors and a portion, but not all, of a surface area 208 of a second piezoelectric sensor 210 of the two piezoelectric sensors. The portion of the surface area of the first piezoelectric sensor 206 covered by the fluid 154 is larger than the second portion of the surface area 208 of the second piezoelectric sensor 210 covered by the fluid 154. In this embodiment, the surface areas 204, 208 of the first and second piezoelectric sensors 206, 210 are those surfaces that interact with the ink 154 to exploit the piezoelectric effect of the activated sensors on the materials adjacent the surfaces of the sensors.

In the embodiment of FIG. 2, the controller is configured to activate or excite the first and second piezoelectric sensors 206, 210 through the pair of conductors 164 operatively connected to the first and second piezoelectric sensors 206, 210. When the first and second piezoelectric sensors 206, 210 are first excited with an activation signal from the controller, these sensors distend into the volume adjacent the sensors to perturb the substance occupying that volume. The effect of an activated sensor on air in the volume is different than the effect of the activated sensor on ink in that volume. Similarly, the effect of the activated sensor on that volume differs for a sensor almost completely covered by ink and one that is only partially covered by ink. The substance or proportions of different substances perturbed by the sensor also produces a responsive effect in the sensor. This effect generates an electrical signal in the conductor between the controller and the sensor that varies in frequency and/or amplitude with regard to the substance or substance proportions perturbed by the sensor. These signatures that differ with respect to the response of the sensor to the material(s) perturbed by an activated sensor can be obtained empirically for different sensor configurations and types of sensors and/or inks. Each of these signatures is correlated with an ink level in the reservoir to enable the controller 10 to capture a signal from the conductor connecting the controller to a sensor and identify an ink level at the sensor.

For example, the activation or excitation of the first and second piezoelectric sensors 206, 210 enables the controller 10 to identify a fluid level 168 from a difference between the electrical signals received as a return or echo from the first piezoelectric sensor 206 and the electrical signals received as a return or echo from the second piezoelectric sensor 210. The piezoelectric sensors can be excited independently where the vibrations induced by the activated sensor generate a signal from an adjacent non-activated sensor. Repeating this process with the other sensor establishes "return" signals that can be compared, enabling determination of fluid submersion differences that can be translated to a determined fluid level. This cycle can be repeated any number of times and can be utilized with any number of sensors excited one at a time or in any combination. Return or echo signal evaluation is a process that is generally known in the art.

FIG. 3 shows a partial view of a third piezoelectric sensor 302 positioned between the first and second piezoelectric sensors 206, 210. The third piezoelectric sensor 302 is positioned at a first distance 304 to the first piezoelectric sensor 206 and at a second distance 306 to the second piezoelectric sensor 210. The first and second distances 304, 306 enable the ink 154 in the volume to cover simultaneously the portion of the surface area 204 of the first piezoelectric sensor 206, the portion of the surface area 208 of the second piezoelectric sensor 210, and a portion of a surface area 308 of the third piezoelectric sensor 302. The portion of the surface area 204 of the first piezoelectric sensor 206 covered by the ink 154 is larger than the portion of the surface area 308 of the third piezoelectric sensor 302 covered by the ink 154. The portion of the surface area 308 of the third piezoelectric sensor 302 covered by the ink 154 is larger than the portion of the surface area 208 of the second piezoelectric sensor 210 covered by the ink 154. In this embodiment, the surface areas 204, 208, 308 of the first, second, and third piezoelectric sensors 206, 210, 302 are those surfaces that interact with the ink 154 to exploit the piezoelectric effect of the activated sensors on the materials adjacent to the surfaces of the sensors.

In a first embodiment of the sensor arrangement depicted in FIG. 3, the controller is configured to activate or excite the first, the second, and the third piezoelectric sensors 206, 210, 302 through the pair of conductors 164 operatively connected to the first, the second, and the third piezoelectric sensors 206, 210, 302, respectively. In this embodiment, the controller sequentially excites each of the piezoelectric sensors 206, 210, 302 with an adequate interval pause therebetween that allows the un-powered sensors to generate signal responses due to the ink motion and damping characteristics produced during active excitation. The activation of the first, second, and third piezoelectric sensors 206, 210, 302 enables the controller to identify the fluid level 168 from a difference between the electrical signals received from the first piezoelectric sensor 206, the electrical signals received from the second piezoelectric sensor 210, and electrical signals received from the third piezoelectric sensor 302. In particular, analysis of the output signals of each sensor based on the ink motion due to resonance as influenced by the fluid level and the degree to which fluid covers the surface area of each sensor can be interpolated as volume level.

In a second embodiment of the sensor arrangement depicted in FIG. 3, the controller is configured to activate one of the first, the second, and the third piezoelectric sensors through the pair of conductors operatively connected to the activated sensor. For example, the controller can excite a lower piezoelectric sensor, i.e., a sensor that is more likely to be submerged in a fluid than the other sensors in the sensor arrangement, and then monitor all or some of the nearby sensors and determine from the characteristics of the signals received from those sensors the fluid level in the reservoir. The activation of the sensor enables the controller to identify the fluid level 168 from a difference between the electrical signals received from the first piezoelectric sensor 206, the electrical signals received from the second piezoelectric sensor 210, and the electrical signals received from the third piezoelectric sensor 302.

In at least one embodiment of the sensor arrangement depicted in FIG. 3, the first distance 304 of the third piezoelectric sensor 302 from the first piezoelectric sensor 206 is equal to the second distance 306 of the third piezoelectric sensor 302 from the second piezoelectric sensor 210. In an alternative embodiment, the first distance 304 of the third piezoelectric sensor 302 from the first piezoelectric sensor 206 is different than the second distance 306 of the third piezoelectric sensor 302 from the second piezoelectric sensor 210.

Although only two successive piezoelectric sensors are shown in FIG. 2 and three successive sensors are depicted in FIG. 3, any quantity of sensors greater than that depicted in FIGS. 2 and 3 can be incorporated to achieve a desired fluid sensing resolution. In embodiments incorporating this greater quantity of piezoelectric sensors, the distances between successive sensors can be equal, different, or any combination thereof as long as the surface areas of the successive sensors interact with the ink fluid level at least in the manner depicted in FIGS. 2 and 3.

The piezoelectric sensors of the sensor arrangement are small enough to allow multiple elements to be used in small and irregular shape spaces. The spacing and/or angle of the line or series of piezoelectric sensors establish the resolution capability of the sensor arrangement. In FIGS. 1-3, the piezoelectric sensor arrangement is shown as a straight line, but in alternative embodiments, the arrangement of the sensors can be non-linear. For example, the sensors can be arranged in a variable radial curve or other geometric shapes based on the structure of the delivery system, such as a reservoir in which the container shape is non-uniform in area or volume at different heights.

Various attributes of the reservoir or chamber volume to be measured, such as shape, area to height ratio, and being vented or un-vented, can influence signal generation and processing to achieve desired sensor performance. The sensor arrangement disclosed herein accommodates these variations by enabling excitation and response signal generation to be optimized for the application, for example, by optimizing amplitude, frequency, timing, repetitions, and so forth. Nominal fluid level detection is correlated to known or calibrated fluid volumes or levels relative to the sensors when the device is in an expected or nominal orientation relative to gravity. A sufficient number of sensors in known positions can also be utilized to determine tilt angle in the sensor array axis as fewer sensors are fully or partially immersed when tilted in one direction and a greater number of sensors are fully or partially immersed in another direction relative to the nominal fluid level detection. These differences can be correlated to device or product angle.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A fluid level sensor for measuring a height of a fluid comprising:
    a container having at least one wall that forms a volume for containing a fluid;
    a plurality of piezoelectric sensors arranged along the at least one wall of the container to interact with the fluid within the volume, two of the piezoelectric sensors being positioned to enable fluid in the volume to cover simultaneously a portion, but not all, of a surface area of a first piezoelectric sensor of the two piezoelectric sensors and a portion, but not all, of a surface area of a second piezoelectric sensor of the two piezoelectric sensors, the portion of the surface area of the first piezoelectric sensor covered by the fluid being larger than the portion of the surface area of the second piezoelectric sensor covered by the fluid; and
    a pair of conductors operatively connected to each piezoelectric sensor, the conductors configured to conduct electrical signals to and from each piezoelectric sensor.

2. The fluid level sensor of claim 1 further comprising:
    a controller operatively connected to the pair of conductors from each of the piezoelectric sensors, the controller being configured to activate the first and the second piezoelectric sensors through the pair of conductors operatively connected to the first and the second piezoelectric sensors and to identify a fluid level from a difference between electrical signals received from the first piezoelectric sensor and electrical signals received from the second piezoelectric sensor.

3. The fluid sensor of claim 2, the controller being further configured to identify a second orientation of the container that is different than a first orientation of the container from a difference between electrical signals received from the first and second piezoelectric sensors at the first orientation and electrical signals received from the first and second piezoelectric sensors at the second orientation.

4. The fluid level sensor of claim 1 further comprising:
a third piezoelectric sensor positioned at a location between the two piezoelectric sensors to enable fluid in the volume to cover simultaneously the portion of the surface area of the first piezoelectric sensor, the portion of the surface area of the second piezoelectric sensor, and a portion of a surface area of the third piezoelectric sensor, the portion of the surface area of the first piezoelectric sensor covered by the fluid being larger than the portion of the surface area of the third piezoelectric sensor covered by the fluid and the portion of the surface area of the third piezoelectric sensor covered by the fluid being larger than the portion of the surface area of the second piezoelectric sensor covered by the fluid.

5. The fluid level sensor of claim 4 further comprising:
a controller operatively connected to the pair of conductors from each of the piezoelectric sensors, the controller being configured to activate the first, the second, and the third piezoelectric sensors through the pair of conductors operatively connected to the first, the second, and the third piezoelectric sensors, respectively, and to identify a fluid level from a difference between electrical signals received from the first piezoelectric sensor, electrical signals received from the second piezoelectric sensor, and electrical signals received from the third piezoelectric sensor.

6. The fluid level sensor of claim 4 further comprising:
a controller operatively connected to the pair of conductors from each of the piezoelectric sensors, the controller being configured to activate at least one of the first, the second, and the third piezoelectric sensors through the pair of conductors operatively connected to the activated sensor, and to identify a fluid level from a difference between electrical signals received from the first piezoelectric sensor, electrical signals received from the second piezoelectric sensor, and electrical signals received from the third piezoelectric sensor.

7. The fluid sensor of claim 4 wherein a distance between the third piezoelectric sensor from the first piezoelectric sensor is equal to a distance between the third piezoelectric sensor and the second piezoelectric sensor.

8. The fluid sensor of claim 4 wherein a distance between the third piezoelectric sensor and the first piezoelectric sensor is different than a distance between the third piezoelectric sensor and the second piezoelectric sensor.

9. The fluid sensor of claim 1 wherein the plurality of piezoelectric sensors are configured in a non-linear arrangement.

10. An inkjet printer comprising:
an inkjet printing apparatus having a plurality of inkjet ejectors, the inkjet printing apparatus being configured to eject ink from the inkjet ejectors onto a substrate;
an ink reservoir configured to supply ink to the plurality of inkjet ejectors, the ink reservoir having at least one wall that forms a volume for containing the ink;
a plurality of piezoelectric sensors arranged along the at least one wall of the ink reservoir to interact with the ink within the volume, two of the piezoelectric sensors being positioned to enable the ink in the volume to cover simultaneously a portion, but not all, of a surface area of a first piezoelectric sensor of the two piezoelectric sensors and a portion, but not all, of a surface area of a second piezoelectric sensor of the two piezoelectric sensors, the portion of the surface area of the first piezoelectric sensor covered by the ink being larger than the portion of the surface area of the second piezoelectric sensor covered by the ink; and
a pair of conductors operatively connected to each piezoelectric sensor, the conductors configured to conduct electrical signals to and from each piezoelectric sensor.

11. The inkjet printer of claim 10 wherein the ink reservoir is integrated within the inkjet printing apparatus and ink within the ink reservoir is in direct fluid communication with the inkjet ejectors.

12. The inkjet printer of claim 10 further comprising:
a controller operatively connected to the pair of conductors from each of the piezoelectric sensors, the controller being configured to activate the first and the second piezoelectric sensors through the pair of conductors operatively connected to the first and the second piezoelectric sensors and to identify an ink level from a difference between electrical signals received from the first piezoelectric sensor and electrical signals received from the second piezoelectric sensor.

13. The inkjet printer of claim 10 further comprising:
a third piezoelectric sensor positioned between the two piezoelectric sensors to enable ink in the volume to cover simultaneously the portion of the surface area of the first piezoelectric sensor, the portion of the surface area of the second piezoelectric sensor, and a portion of a surface area of the third piezoelectric sensor, the portion of the surface area of the first piezoelectric sensor covered by the ink being larger than the portion of the surface area of the third piezoelectric sensor covered by the ink and the portion of the surface area of the third piezoelectric sensor covered by the ink being larger than the portion of the surface area of the second piezoelectric sensor covered by the ink.

14. The printer of claim 13 further comprising:
a controller operatively connected to the pair of conductors from each of the piezoelectric sensors, the controller being configured to activate the first, the second, and the third piezoelectric sensors through the pair of conductors operatively connected to the first, the second, and the third piezoelectric sensors, respectively, and to identify an ink level from a difference between electrical signals received from the first piezoelectric sensor, electrical signals received from the second piezoelectric sensor, and electrical signals received from the third piezoelectric sensor.

15. The printer of claim 13 further comprising:
a controller operatively connected to the pair of conductors from each of the piezoelectric sensors, the controller being configured to activate at least one of the first, the second, and the third piezoelectric sensors through the pair of conductors operatively connected to the activated sensor, and to identify an ink level from a difference between electrical signals received from the first piezoelectric sensor, electrical signals received from the second piezoelectric sensor, and electrical signals received from the third piezoelectric sensor.

16. The printer of claim 13 wherein a distance between the third piezoelectric sensor and the first piezoelectric sensor is equal to a distance between the third piezoelectric sensor and the second piezoelectric sensor.

17. The printer of claim 13 wherein a distance between the third piezoelectric sensor and the first piezoelectric sensor is different than a distance between the third piezoelectric sensor and the second piezoelectric sensor.

18. An ink cartridge for containing liquid ink comprising:
- an ink reservoir formed within the cartridge, the ink reservoir having at least one wall that forms a volume for containing the liquid ink;
- a plurality of piezoelectric sensors arranged along the at least one wall of the ink reservoir to interact with the liquid ink within the volume, two of the piezoelectric sensors being positioned to enable the liquid ink in the volume to cover simultaneously a portion, but not all, of a surface area of a first piezoelectric sensor of the two piezoelectric sensors and a portion, but not all, of a surface area of a second piezoelectric sensor of the two piezoelectric sensors, the portion of the surface area of the first piezoelectric sensor covered by the liquid ink being larger than the portion of the surface area of the second piezoelectric sensor covered by the liquid ink; and
- a pair of conductors operatively connected to each piezoelectric sensor, the conductors configured to conduct electrical signals to and from each piezoelectric sensor.

19. The ink cartridge of claim 18 further comprising:
- a controller operatively connected to the pair of conductors from each of the piezoelectric sensors, the controller being configured to activate the first and the second piezoelectric sensors through the pair of conductors operatively connected to the first and the second piezoelectric sensors and to identify a liquid ink level from a difference between electrical signals received from the first piezoelectric sensor and electrical signals received from the second piezoelectric sensor.

* * * * *